US012788183B2

(12) United States Patent
Zaratin et al.

(10) Patent No.: US 12,788,183 B2
(45) Date of Patent: Nov. 10, 2026

(54) HERMETICALLY SEALED HOPPER FOR FEEDINGS BEANS, AND CORRESPONDING METHOD OF OPERATION

(71) Applicant: DE' LONGHI APPLIANCES S.R.L. CON UNICO SOCIO, Treviso (IT)

(72) Inventors: Enrico Zaratin, Treviso (IT); Simone Rosetta, Treviso (IT); Erik Eisenkolb, Treviso (IT)

(73) Assignee: DE' LONGHI APPLIANCES S.R.L. CON UNICO SOCIO, Treviso (IT)

( * ) Notice: Subject to any disclaimer, the term of this patent is extended or adjusted under 35 U.S.C. 154(b) by 86 days.

(21) Appl. No.: 18/858,638

(22) PCT Filed: Apr. 21, 2023

(86) PCT No.: PCT/IT2023/050107
§ 371 (c)(1),
(2) Date: Oct. 21, 2024

(87) PCT Pub. No.: WO2023/203587
PCT Pub. Date: Oct. 26, 2023

(65) Prior Publication Data

US 2025/0268425 A1 Aug. 28, 2025

(30) Foreign Application Priority Data

Apr. 21, 2022 (IT) ........................ 102022000007898

(51) Int. Cl.
*A47J 42/50* (2006.01)
*A47J 31/42* (2006.01)

(52) U.S. Cl.
CPC ............... *A47J 42/50* (2013.01); *A47J 31/42* (2013.01)

(58) Field of Classification Search
CPC .................................. A47J 31/42; A47J 42/50
See application file for complete search history.

(56) References Cited

U.S. PATENT DOCUMENTS

2013/0095219 A1* 4/2013 de Graaff .............. A47J 31/404 99/286
2019/0365137 A1* 12/2019 Elias ........................ A47J 31/42
2020/0375388 A1* 12/2020 MacFarlane ....... G06Q 20/3224

FOREIGN PATENT DOCUMENTS

DE 20115968 U1 * 1/2002 .............. A47J 47/06
EP 3366612 A1 * 8/2018 ............. B65D 83/76
WO 2006120560 A1 11/2006
WO WO-2022024153 A1 * 2/2022 .............. A47J 42/50
WO 2023203587 A1 10/2023

OTHER PUBLICATIONS

Machine translation of DE-20115968-U1.*
Machine Translation of EP-3366612-A1.*
Machine translation of WO-2022024153-A1.*
International Search Report and Written Opinion for International PCT Application No. PCT/IT2023/050107, dated Jun. 12, 2023.

* cited by examiner

*Primary Examiner* — Jeremy Carroll
(74) *Attorney, Agent, or Firm* — K&L Gates LLP

(57) ABSTRACT

Hermetically sealed hopper (10) for feeding beans, comprising a closing lid (17), a container (11) having an open upper end (16) and a lower end (19). The lid (17) is provided with first sealing means (30), of the flexible type, configured to cooperate in a sliding and hermetic manner with the internal surface (13).

14 Claims, 3 Drawing Sheets

HERMETICALLY SEALED HOPPER FOR FEEDINGS BEANS, AND CORRESPONDING METHOD OF OPERATION

CROSS-REFERENCE TO RELATED APPLICATIONS

This application is a U.S. National Stage Entry under 35 U.S.C. § 371 of International Patent Application No. PCT/IT2023/050107, entitled HERMETICALLY SEALED HOPPER FOR FEEDINGS BEANS, AND CORRESPONDING METHOD OF OPERATION, filed Apr. 21, 2023, which claims benefit of Italian Patent Application No. 102022000007898, filed Apr. 21, 2022, the entire disclosures of which are hereby incorporated by reference herein.

FIELD OF THE INVENTION

The present invention concerns a hermetically sealed hopper for feeding beans, in particular, but not only, coffee beans. The hopper can be used in machines for preparing coffee beverages, of the automatic, semi-automatic or manual type, for domestic or semi-professional use, or in machines for grinding coffee beans. The present invention also concerns the method of operation of the hopper.

BACKGROUND OF THE INVENTION

Machines are known for preparing beverages starting from beans, or machines for grinding beans, such as coffee beans, which can be associated with a hopper suitable to contain the beans, in order to feed them to a grinding device present in said machines.

In particular, machines provided with hoppers of the removable type, allowing consumers to be able to change the type of coffee beans to be used, are increasingly widespread.

The hoppers comprise a container having an open upper end through which the beans are introduced, and a lower end provided with at least one aperture for them to exit.

Known hoppers are normally provided with a closing lid in correspondence with the upper end and with suitable closing means in correspondence with the lower end, which allow said aperture to be selectively closed in relation to the specific operating requirements.

A very important aspect to consider for these known hoppers concerns the presence of air inside the container, which often entails the oxidation of the beans present inside it, with a consequent loss of their organoleptic properties.

In relation to this, the lid associated with the upper end is usually hermetically sealed and is provided with vent valves which allow to reduce the volume of air present inside the container itself, above the beans. In particular, suction means can be associated with said valves, which, however, have to be driven manually by the consumer to obtain the desired reduction in the volume of air.

As a consequence, due to practicality or sometimes due to incompetence, the consumer often does not carry out this operation, thus entailing the disadvantage that the coffee beans oxidize and lose their initial organoleptic properties, with the consequent loss of quality of the coffee produced with them.

Solutions are also known in which the suction means can be automated, but these solutions are very expensive since they require both circuits as well as dedicated control means.

Another disadvantage of known hoppers is that the aperture at the lower end is not hermetically sealed, therefore there is in any case an uncontrolled entry of air into the hopper, even when the respective closing means are driven to close the lower end itself.

Document EP3366612A1 concerns a cartridge containing a dense substance, provided with a piston which is driven by compressed air or with a mechanical piston, to squeeze the substance toward an exit aperture. The piston is configured to move in one direction only and is provided with a lip, which always remains inclined toward the exit aperture and defines a pocket in which the substance accumulates as the piston gradually advances in the cartridge toward the exit aperture, being progressively pressed toward the wall of the cartridge to define a seal.

Documents WO2022/024153A1 and DE20115968U1 describe hoppers for containing coffee beans or coffee powder.

There is therefore a need to perfect a hermetically sealed hopper for containing and feeding beans which can overcome at least one of the disadvantages of the state of the art.

To do this it is necessary to solve the technical problem of providing a hopper in which the volume of air inside the hopper is reduced and kept to a minimum.

One purpose of the present invention is to provide a hermetically sealed hopper for feeding beans which is selectively able to prevent the uncontrolled entry of air into the hopper.

Another purpose of the present invention is to provide a hermetically sealed hopper for feeding beans which is simpler and cheaper than in the state of the art.

Another purpose of the present invention is to provide a hermetically sealed hopper for feeding beans which is easy to use and to integrate into a machine for preparing beverages, or for grinding beans.

The Applicant has devised, tested and embodied the present invention to overcome the shortcomings of the state of the art and to obtain these and other purposes and advantages.

SUMMARY OF THE INVENTION

The present invention is set forth and characterized in the independent claims. The dependent claims describe other characteristics of the present invention or variants to the main inventive idea.

In accordance with the above purposes and to resolve the technical problem disclosed above in a new and original way, also achieving considerable advantages compared to the state of the prior art, a hermetically sealed hopper according to the present invention, for feeding beans, comprises a closing lid, a container having an internal surface, an open upper end and a lower end opposite the upper end.

In accordance with one aspect of the present invention, the lid is provided with first sealing means, of the flexible type, configured to cooperate in a sliding and hermetic manner with the internal surface so as to prevent a passage of air toward the upper end through the lid, wherein the first sealing means are provided with a plurality of by-pass elements.

Moreover, when inserted in the container through the upper end the lid is configured to move both toward the lower end and also toward the upper end.

The sealing means comprise a flexible ring, which is provided with the by-pass elements.

In accordance with another aspect of the invention, the flexible ring is configured to flex upward or downward in relation to a direction of movement of the lid and pass from a sealing condition in which it allows a hermetically sealed closure, preventing a passage of air through the lid, to a passage condition in which it allows a passage of air by means of the plurality of by-pass elements, as a function of a movement of the lid in one or the other direction.

In the sealing condition the flexible ring is inclined by a first angle toward the upper end, while in the passage condition it is inclined by a second angle toward the lower end.

The second angle is substantially opposite to the first angle with respect to a horizontal plane.

The flexible ring can therefore assume two different conformations, substantially opposite to each other, and the different conformation essentially inhibits or enables the function of the by-pass elements.

According to some embodiments, in the sealing condition the flexible ring is inclined by a first angle and in the passage condition it is inclined by a second angle, opposite to the first angle with respect to a horizontal plane.

According to some embodiments, the first angle and second angle are comprised between approximately 15° and 40°, measured with respect to a horizontal plane, preferably they are comprised between 20° and 35°.

According to some embodiments, the first and second angle can be substantially symmetrical with respect to the horizontal plane.

According to other embodiments, the first and second angle can be different from each other.

According to some embodiments, the by-pass elements are disposed on a perimeter zone of an upper face of the flexible ring.

In accordance with another aspect of the present invention, the flexible ring protrudes radially from the lid, and it protrudes with respect to a perimeter edge of the lid and is configured to be in contact with the internal surface when the closing lid is inserted in the container.

In accordance with another aspect of the present invention, the by-pass elements are made as recesses which extend in a radial direction of the upper face and are configured to allow the passage of air when the lid slides toward the upper end.

In accordance with another aspect of the present invention, the lid comprises a substantially C-shaped perimeter edge which defines a circular groove, and the flexible ring is disposed inside this circular groove.

In accordance with another aspect of the present invention, the lid is designed and manufactured so as to have a weight such as to overcome a resistance generated by a friction force which is generated between the first sealing means and the internal surface and, during use, it is configured to move due to the action of a force of gravity toward the lower end.

The hopper comprises a closing bottom provided with at least one outlet aperture and associated with the lower end, wherein the lower end is provided with at least one passage aperture configured to allow the passage of the beans.

In accordance with another aspect of the present invention, the closing bottom and the container are rotatable with respect to each other so as to define a closing position and an opening position, to allow and prevent, respectively, the passage of beans. Moreover, the bottom comprises second sealing means configured, in the closing position, to cooperate with the at least one passage aperture in order to close it with a hermetic seal.

This gives the advantage that the hopper is hermetically sealed; therefore, the beans present inside the container are less subjected to oxidation, keeping the organoleptic properties unchanged for a longer period of time.

In accordance with another aspect of the present invention, the second sealing means comprise at least one circular sector provided with at least one deformable and/or elastic raised perimeter edge along its perimeter which, in the closing position, cooperates with a perimeter edge of the passage aperture, allowing the hermetically sealed closure of the passage aperture.

In accordance with another aspect of the present invention, in the opening position the outlet aperture is at least partly aligned with the passage aperture to allow the passage of the beans.

The present invention also concerns a method of operation of the hopper, wherein the method comprises a preparation step in which the hopper is disposed in a given machine, a filling step in which the beans are introduced into the container through the upper end, a first movement step in which the lid is inserted in the hopper through the upper end until it is in contact with the beans.

In accordance with another aspect of the present invention, the method comprises an operating step in which the beans are fed and made to pass through the at least one passage aperture and, as the level of the beans drops, the lid slides toward the lower end continuing to contact the beans, overcoming the resistance created by the friction force thanks to the action of its weight, wherein the first sealing means are located in the sealing condition and cooperate in a sliding and hermetic manner with the internal surface, hermetically closing the container.

In accordance with another aspect of the present invention, following the preparation step, the hopper is axially rotated with respect to the closing bottom, which is integral with the machine, to pass from the opening position to the closing position, or vice versa, in order to allow or prevent, respectively, the passage of the beans through the at least one passage aperture and the at least one outlet aperture in correspondence with the lower end.

In accordance with another aspect of the present invention, the method comprises a second movement step, in which the lid is extracted from the container by making it slide toward the upper end in such a way that the first sealing means pass into the passage condition and the by-pass elements allow the passage of air between the lid and the internal surface, facilitating its extraction.

In accordance with another aspect of the present invention, when the lid slides toward the lower end the flexible ring is inclined toward the upper aperture and when the lid slides toward the upper end the flexible ring is inclined toward the lower aperture.

DESCRIPTION OF THE DRAWINGS

These and other aspects, characteristics and advantages of the present invention will become apparent from the following description of some embodiments, given as a non-restrictive example with reference to the attached drawings wherein.

Figure 1:
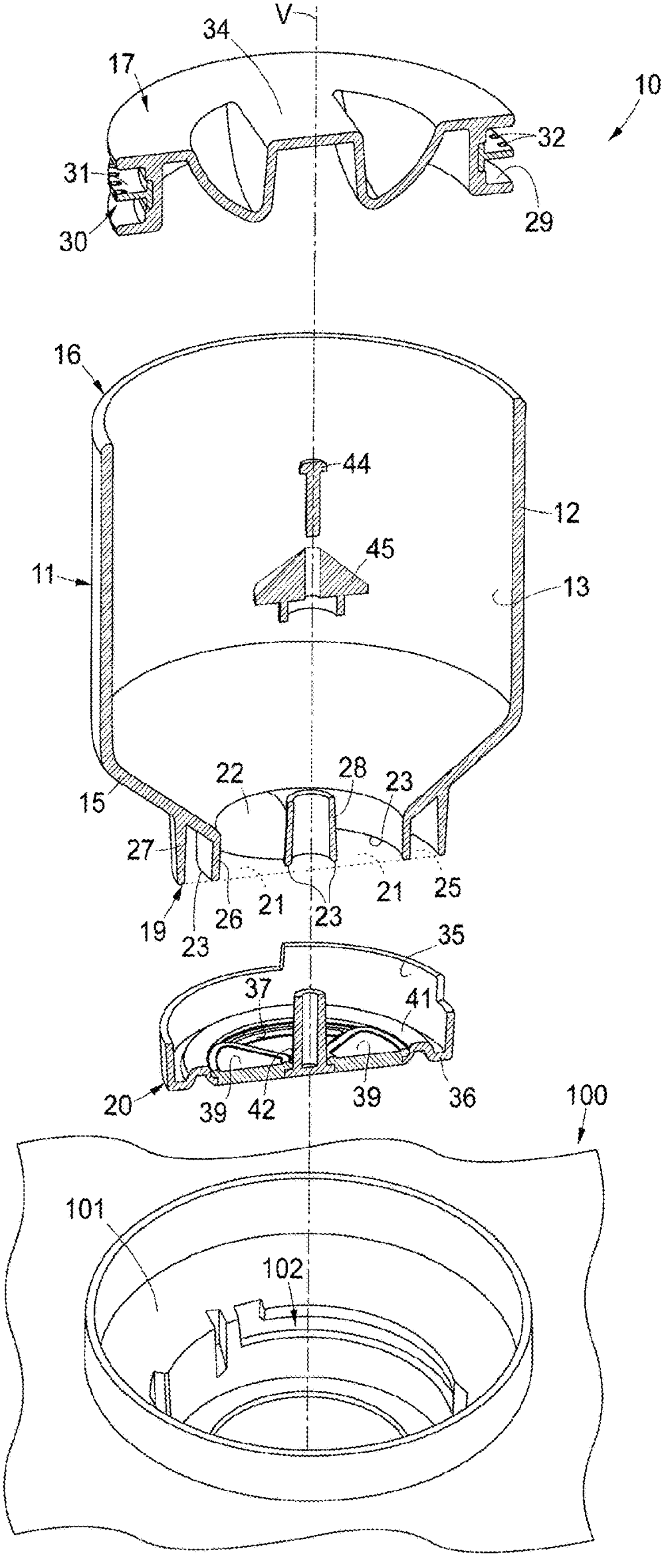
FIG. 1 is an exploded and partly sectioned three-dimensional view of a hermetically sealed hopper for feeding beans according to the present invention, which can be inserted in a machine for preparing beverages.

We must clarify that in the present description the phraseology and terminology used, as well as the figures in the attached drawings also as described, have the sole function of better illustrating and explaining the present invention, their function being to provide a non-limiting example of the invention itself, since the scope of protection is defined by the claims.

To facilitate comprehension, the same reference numbers have been used, where possible, to identify identical common elements in the drawings. It is understood that elements and characteristics of one embodiment can be conveniently combined or incorporated into other embodiments without further clarifications.

DESCRIPTION OF SOME EMBODIMENTS OF THE PRESENT INVENTION

With reference to FIG. 1, a hermetically sealed hopper 10 according to the present invention is suitable to feed beans, for example, but not only, coffee beans, and can be used in a machine 100 for preparing beverages starting from such beans, or in a machine for grinding such beans.

By way of example, the machine 100 for preparing beverages can be of the automatic, semi-automatic or manual type, for domestic or semi-professional use.

In accordance with possible embodiments, the hopper 10 is of the removable type and can be inserted from above into a suitable housing compartment 101 of the machine 100.

By way of example, the coupling between the hopper 10 and the housing compartment 101 can be achieved by means of a bayonet mechanism 102, of a known type and therefore not described in detail, which uses a rotation with respect to a vertical axis V to clamp and unclamp the hopper 10 in the housing compartment 101.

When inserted in the housing compartment 101, the hopper 10 is able to rotate around the vertical axis V to selectively pass from a closing position, or condition, to an opening position, or condition, and vice versa. In particular, in the opening position the hopper 10 is able to feed the beans present therein toward a grinding device, not shown in the drawings, as will be described in detail below.

Moreover, in correspondence with the housing compartment 101 there is at least one detection sensor 103 (FIG. 5) which is configured to detect both the presence of the hopper 10 and also the position, or condition, in which it is found, that is, if it is rotated to a closing or opening position.

In accordance with other embodiments of the present invention, not shown in the drawings, the hopper 10 is of the type which cannot be removed from the machine 100; despite this, the characteristic of being able to rotate with respect to the vertical axis V is maintained even in this case, so that it can pass from the closing position to the opening position and vice versa.

The hopper 10 comprises a container 11 (FIGS. 1 and 5) in which the beans are inserted, which consists of a substantially cylindrical lateral wall 12 having an internal surface 13, which essentially defines a part of the internal surface of the hopper 10 itself in this zone, and of a lower portion 15 which can have a diameter which decreases progressively downward, that is, toward the machine 100.

In particular, the container 11 comprises an open upper end 16 through which the beans are inserted and on which a closing lid 17 is located, or able to be positioned, and a lower end 19 with which a closing bottom 20 is associated. The container 11 and the bottom 20 are rotatable with respect to each other around the vertical axis V.

As shown in FIG. 1, the lower end 19 is provided with one or more passage apertures 21 which allow the passage of the beans present in the hopper 10 toward the grinding device of the machine 100.

Please note that each passage aperture 21 has a respective perimeter edge 23. Furthermore, interposed between the passage apertures 21, there can be one or more conveying portions 22 having a shape such as to convey the beans toward the passage apertures 21; in the example given here the conveying portions 22 are in the shape of a dip.

In the example given here there are two passage apertures 21 symmetrical to each other; however, according to other embodiments of the present invention, there could even be only one passage aperture 21 or, alternatively, more than two.

In correspondence with the lower end 19, the container 11 is provided with an annular groove 25 which is configured to couple sliding with a circular relief 41 of the bottom 20. The annular groove 25 is defined by two protrusions, preferably two circular rings, respectively an internal ring 26, which constitutes the circumferential edge of the lower end 19, and an external ring 27.

Figure 5:
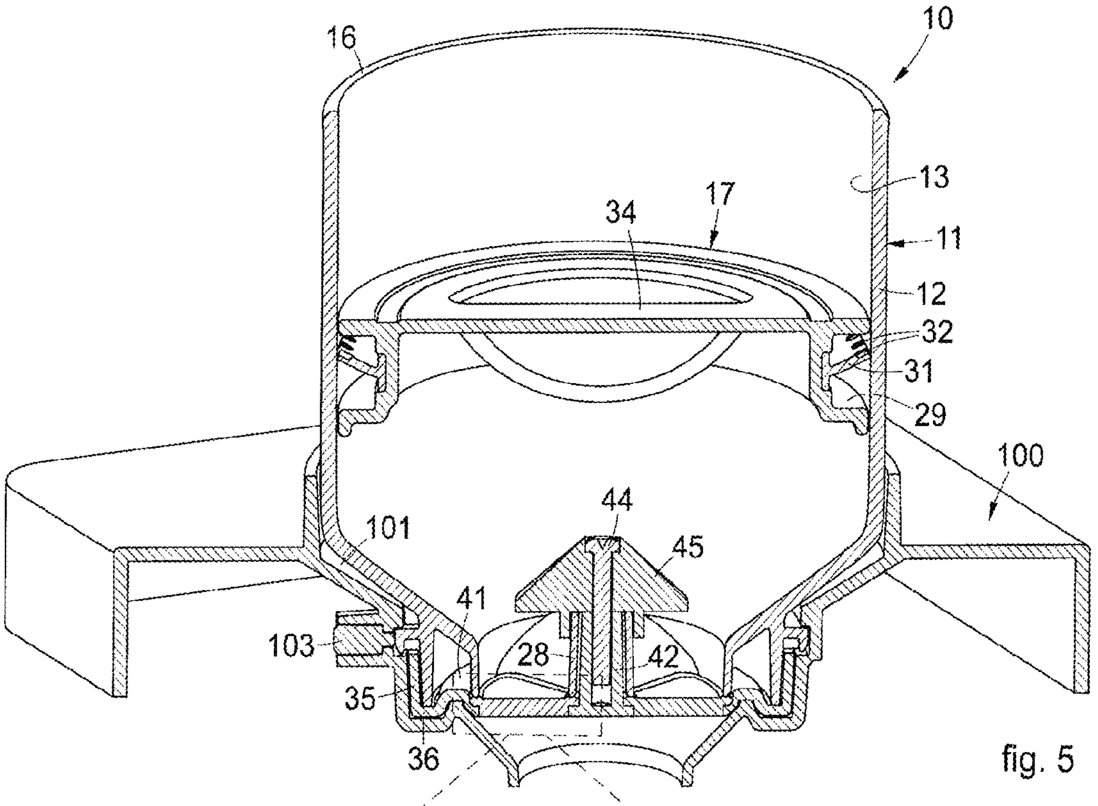
FIG. 5 is a sectional three-dimensional view of the hopper of FIG. 1 positioned in a machine for preparing beverages.

As shown in FIGS. 1 and 5, the container 11 is provided with a first hollow central pin 28 which has the function of allowing to correctly position the bottom 20, as will be described in detail below.

The lid 17 (FIG. 2) has a circular shape, substantially cylindrical, with a diameter slightly smaller than the diameter of the container 11, and it can comprise a substantially C-shaped perimeter edge that defines a circular groove 29 (FIGS. 1, 5, 8 and 9).

During use, the lid 17 is located on the upper end 16 above the beans present in the hopper 10. In order to reduce the volume of air present inside the hopper 10 between the lid 17 and the beans present in the hopper 10, the lid 17 is configured to slide toward the lower end 19 along the vertical axis V, as described below.

The lid 17 (FIGS. 2 and 5) is provided with first sealing means 30 of the flexible type, configured to allow the lid 17 to slide and create a hermetic contact with the internal surface 13 of the container 11.

In this way, the first sealing means 30 allow to hermetically close the hopper 10 with respect to any air coming from the open upper end 16. In other words, once the lid 17 has been inserted from the upper end 16 of the hopper 10, the beans present in the hopper 10 are insulated from the air coming from the upper end 16.

In particular, the first sealing means 30 comprise, or consist of, a flexible ring 31 which protrudes radially from the lid 17 or, optionally, which is disposed inside the circular groove 29.

The flexible ring 31 in particular is capable of flexing in such a way that the edge protruding outward can be respectively flexed upward or downward with respect to an internal edge integral with the lid 17.

When the protruding edge flexes upward, the flexible ring 31 is in fact inclined toward the upper end 16, while when the protruding edge flexes downward, the flexible ring 31 is in fact inclined toward the lower end 19.

The flexible ring 31 protrudes slightly with respect to a perimeter edge of the lid 17 and contacts the internal surface 13 of the container 11.

In other words, the diameter of the closing lid 17 has a smaller size both with respect to the external diameter of the flexible ring 31 and also with respect to a diameter of the internal surface 13.

Conversely, the diameter of the first sealing means 30, optionally of the flexible ring 31, is slightly larger than the diameter of the internal surface 13, preferably up to about 0.3-1% larger, for example in the order of about 0.3-1 mm.

In this way, when the lid 17 is subjected to a force acting along the axis V, a friction force is generated between the first sealing means 30, optionally the flexible ring 31, and the internal surface 13 of the container 11. By way of example, the flexible ring 31 is made of rubber.

In order to reduce the volume of air present inside the container 11 between the lid 17 and the beans present inside it, the lid 17 is configured to slide toward the lower end 19 along the axis V, cooperating with the internal surface 13 by means of the flexible ring 31.

In particular, the lid 17 is advantageously designed and manufactured in such a way as to have a weight such as to overcome the resistance generated by the friction force which is generated between the first sealing means 30 and the internal surface 13 and, therefore, in such a way to slide toward the lower end 19 thanks only to the action of its weight.

Alternatively, the movement of the lid 17 can be generated by an external force applied to the lid 17, for example by an operator. In this way, the lid 17, resting on top of the beans present in the hopper 10, is able to adapt to the level or quantity of beans present in the container 11, and to reduce the volume of air present in the latter above the beans.

Please note that the flexible ring 31 is capable of flexing upward or downward in relation to the direction of the movement of the lid 17.

In particular, sliding toward the lower end 19 the flexible ring 31 will flex slightly upward (FIG. 8) so as to reduce the contact surface with the internal surface 13 and therefore the resistance of the friction force, thus facilitating the downward sliding of the lid 17.

Conversely, when sliding toward the upper end 16, for example if a force is applied to the lid 17 so as to extract it from the container 11, the flexible ring 31 will flex downward (FIG. 9), mirroring the previous condition.

According to some embodiments, it can be provided that the flexible ring 31, following a downward movement (arrow F1 in FIG. 8), for example due to the weight force or to an external stress acting on the lid 17, can assume an upward inclination by a first angle $\alpha$1.

By way of example, the first angle $\alpha$1 can advantageously be comprised between 15° and 40°, and preferably between 20° and 35°.

Following an upward movement of the lid 17 (arrow F2 in FIG. 9), for example due to a traction force acting on it, the flexible ring 31 can assume a downward inclination by a second angle $\alpha$2.

By way of example, the second angle $\alpha$2 can advantageously be comprised between 15° and 40° and preferably between 20° and 35°.

According to some embodiments, the first angle $\alpha$1 and the second angle $\alpha$2 can be substantially symmetrical with respect to a horizontal plane P.

According to some variants, it can also be provided that the first $\alpha$1 and the second angle $\alpha$2 are different from each other.

The first $\alpha$1 and the second angle $\alpha$2 can vary as a function of the size and/or thickness of the flexible ring 31.

As an indication, it can be provided that the flexible ring 31 has a width in the radial direction comprised between 0.5-1.5 cm and a thickness comprised between 0.5 and 2.5 mm.

Figure 2:
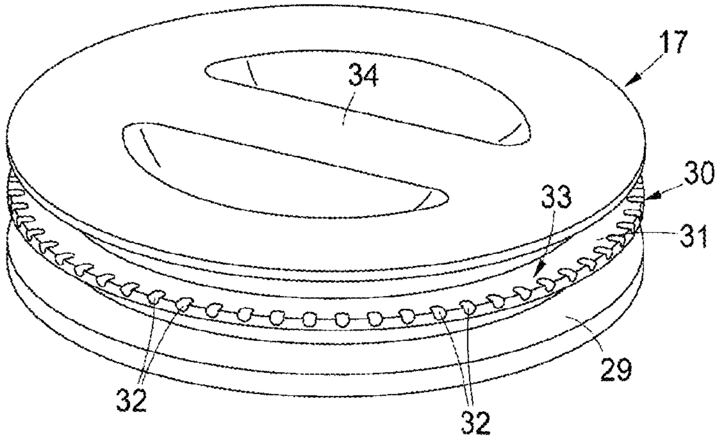
FIG. 2 is a three-dimensional view of a lid of the hopper of FIG. 1.

In accordance with another aspect of the present invention, the flexible ring 31 is provided with a plurality of by-pass elements 32 (FIG. 2).

According to some embodiments, the by-pass elements 32 are disposed on a perimeter zone of an upper face 33 thereof.

Each by-pass element 32 is preferably made in the form of a recess on the upper face 33 of the flexible ring 31.

According to some embodiments, the by-pass elements 32 are small in size compared to the size of the diameter of the lid 17 and of the flexible ring 31.

Preferably, the by-pass elements 32 extend in a radial direction up to an external edge of the upper face 33.

By way of example, the by-pass elements 32 can extend in a radial direction for a portion comprised between 20% and 50% of the width of the flexible ring 31.

The by-pass elements 32 are configured to allow the passage of air between the lid 17 and the internal surface 13, only if the lid 17 slides toward the upper end 16.

When the lid 17, inserted in the container 11, is subjected to a force directed toward the lower end 19 (arrow F1 in FIG. 8), the flexible ring 31 flexes upward, in other words toward the upper end 16. In this case, the flexible ring 31 contacts the internal surface 13 of the container 11 with the edge of its lower face, which is continuous. In this way a passage of air between the internal surface 13 and the lid 17 is prevented.

When the lid 17, inserted in the container 11, is subjected to a force directed toward the upper end 16 (arrow F2 in FIG. 9), the flexible ring 31 flexes downward, in other words toward the lower end 19. In this case, the flexible ring 31 contacts the internal surface 13 of the container 11 with the edge of its upper face 33 (FIG. 2), which is discontinuous due to the presence of the by-pass elements 32.

Figure 8:
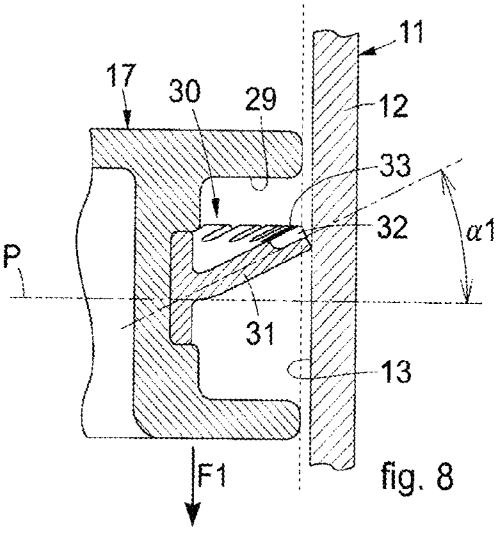
FIGS. 8 and 9 are enlarged and out-of-scale detailed views of two operating conditions of the lid of FIG. 2.
Figure 9:
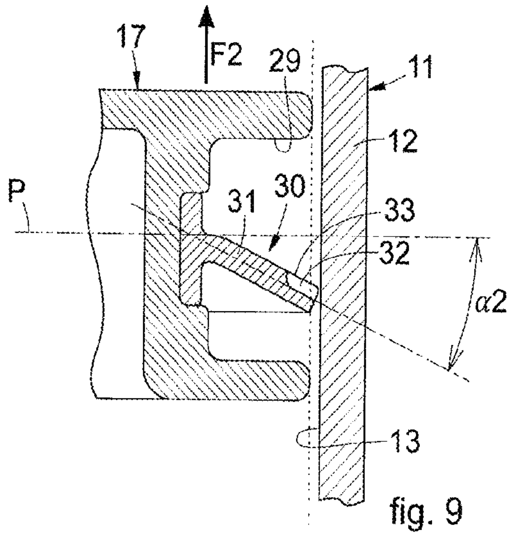

In this situation, as can be seen in FIGS. 8 and 9, in correspondence with the by-pass elements 32, the flexible ring 31 does not come into contact with the internal surface 13 of the container 11, therefore the air can pass freely through the gaps defined between the flexible ring 31 and the internal surface 13, and the friction force between the flexible ring 31 and the internal surface 13 is reduced. This therefore facilitates the extraction of the lid 17 from the container 11.

Therefore, the first sealing means 30 are capable of passing from a sealing condition in which they allow a hermetically sealed closure, preventing a passage of air through the lid 17, to a passage condition in which, by means of the by-pass elements 32, they allow air to pass through the lid 17.

This solution advantageously allows to obtain a simple and inexpensive lid 17, in which valves or other devices are not required to be able to pass from the sealed condition to the passage condition, but which is sufficient to invert the flexing direction of the flexible ring 31.

The lid 17 is also provided with an extraction handle 34 (FIGS. 1, 2 and 5) made in such a way as to facilitate the grip and, therefore, the extraction of the lid 17 itself from the container 11. The extraction handle 34 can consist of an element which protrudes from the lid 17, or it can consist of a part of the surface of the lid 17 comprised between two recesses of the lid 17 itself.

Figure 4:
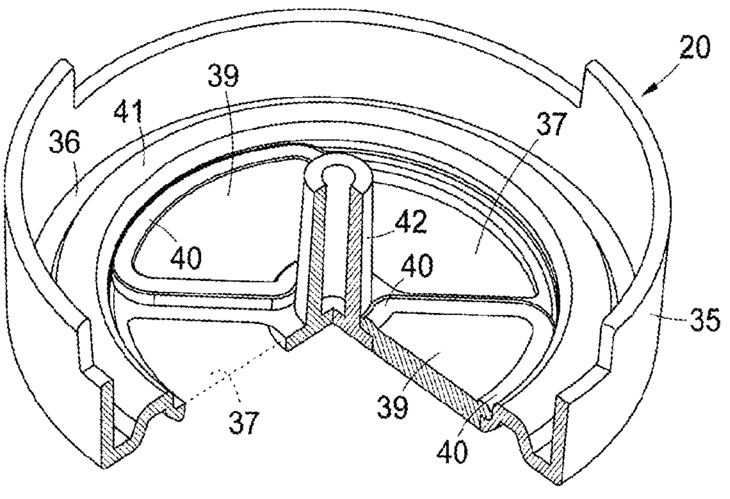
FIG. 4 is a three-dimensional view of a closing bottom of the hopper of FIG. 1.

The bottom 20 (FIG. 4) is circular, substantially cylindrical, and is configured to couple with the lower end 19 of the hopper 10.

The closing bottom 20 comprises a base wall 36 in which one or more outlet apertures 37 are created. In particular, the outlet apertures 37 are equal in number to the passage apertures 21 of the lower end 19 of the hopper and are advantageously of the same shape.

The outlet apertures 37, in the opening position of the hopper 10, are aligned with the corresponding passage apertures 21 to allow the passage of the beans toward the grinding device 100, while in the closing position they are aligned with the conveying portions 22 in in such a way as to prevent the passage of beans.

For example, the bottom 20 can comprise a lateral wall 35 configured to couple both with the external ring 27 of the container 11 and also with the housing compartment 101.

Figure 3:
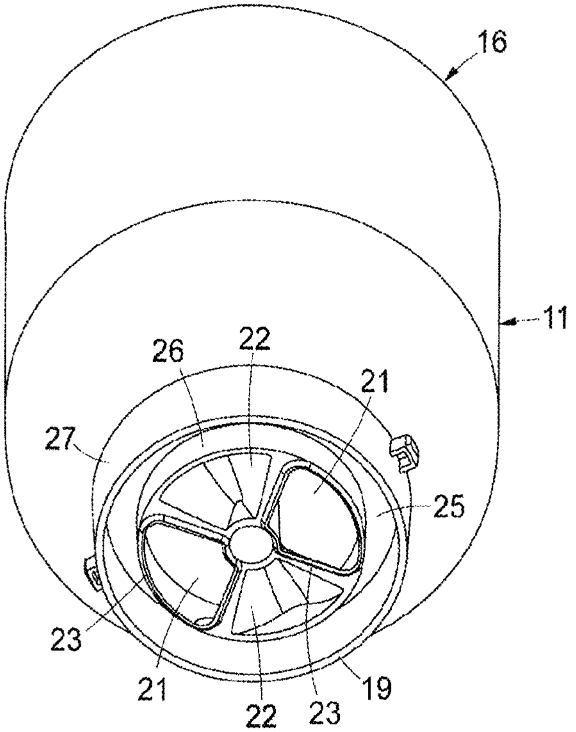
FIG. 3 is a three-dimensional view of the hopper of FIG. 1 from below.

In accordance with another aspect of the present invention, the bottom 20 comprises one or more second sealing means 39 (FIG. 4) which are configured to cooperate with the perimeter edge 23 (FIG. 3) of the passage apertures 21 in order to close the latter and, therefore, the lower end 19 itself, in a hermetically sealed manner.

The second sealing means 39 (FIG. 4) comprise, or consist of, circular sectors of insulating material, for example rubber, which are substantially flat. If there is a plurality of outlet apertures 37, the second sealing means 39 are interposed between the outlet apertures 37. In particular, each of the second sealing means 39 (FIGS. 4, 6 and 7) is provided with a deformable and/or elastic raised perimeter edge 40.

Preferably, the perimeter edge 40 is continuous and it has a shape coherent with that of a respective passage aperture 21.

Figure 6:
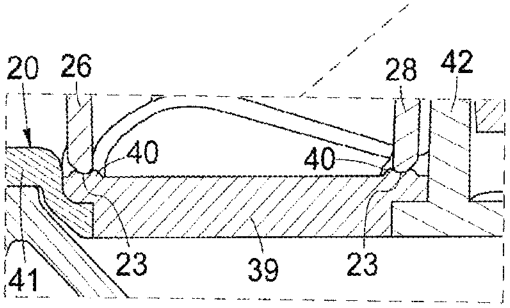
FIG. 6 is an enlarged and out-of-scale view of a detail of FIG. 5, in which the hopper of FIG. 1 is in a closing position.
Figure 7:
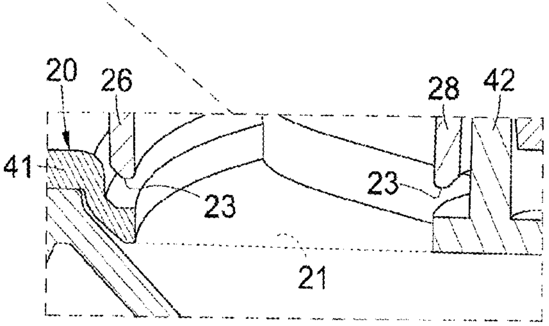
FIG. 7 is an enlarged and out-of-scale view of a detail of FIG. 5, in which the hopper of FIG. 1 is in an opening position.

In this way, when the hopper 10 is in the closing position, the second sealing means 39 are aligned with the passage apertures 21 and the raised perimeter edge 40 is compressed on the perimeter edge 23 of the passage apertures 21 so as to close them in a hermetically sealed manner (FIGS. 6 and 7).

The bottom 20 can also comprise a second hollow central pin 42 (FIGS. 1, 4 and 5) which is configured to be inserted, with minimal play, inside the first central pin 28, so as to allow the correct positioning of the bottom 20 with respect to the container 11.

In correspondence with the upper part of the second central pin 42 (FIGS. 1 and 5) there is attached in a removable manner, by means of suitable attachment means 44, such as a screw for example, a covering element 45, also called "finger guard", known to the people of skill in the art.

Please note that the coupling between the first and second central pin 28 and 42, and between the attachment means 44 and the covering element 45 is achieved with minimal play. Alternatively, according to other embodiments of the present invention, not shown in the drawings, suitable packings can be used to prevent the uncontrolled entry of air into the container 11.

The method of operation of the hopper 10 according to the present invention comprises the following steps.

An initial preparation step in which the hopper 10 is inserted in the housing compartment 101 of the machine 100. Optionally, the container 11 is rotated axially around the vertical axis V (FIG. 1) so that the hopper 10 is in the closing position (FIGS. 5 and 6), that is, with the second sealing means 39 which hermetically seal the lower end 19.

Please note that in the event that the hopper 10 is of the non-removable type, the initial preparation step provides to position the latter in the respective closing position.

A filling step, in which a certain quantity of beans is introduced into the container 11.

A first movement step (FIG. 8), called "downward movement", in which the lid 17 is placed, through the upper end 16, inside the container 11 and is made to come into contact with the beans present therein by applying a force directed on the axis V in the direction of the lower end 19 of the hopper 10.

The combined action of the force directed toward the lower end 19 and of the friction force between the first sealing means 30 and the internal surface 13 causes a flexion of the flexible ring 31 toward the upper end 16.

Moreover, since the hopper 10 is in a closing position, the force has to be sufficient both to overcome the resistance generated by the friction force and also to cause an upward flexion of the flexible ring 31, such as to temporarily detach the upper perimeter zone 33 of the latter from the internal surface 13 so that the air can exit toward the upper end 16.

This step allows to reduce the volume of air present above the beans, and reduce oxidative effects on the beans which worsen their organoleptic qualities.

Please note that this first movement step can also occur if the hopper 10 is in an opening position (FIG. 6). In this case, the lid 17 is thrust inside the container 11 with a smaller force than in the case in which the hopper 10 is in a closing position, since this force has to be sufficient only to overcome the resistance generated by the friction force between the first sealing means 30 and the internal surface 13.

Subsequently, in an operating step, if the hopper 10 is in the closing position, the container 11 is rotated so that the hopper is in the opening position (FIG. 7), that is, with the outlet apertures 37 of the bottom 20 aligned with the passage apertures 21. This allows to feed the beans toward the grinding device which then begins to grind them, causing their level inside the container 11 to drop. In particular, as the level of the beans drops, the lid 17 also slides downward, overcoming the resistance created by the friction force thanks to the action of its weight.

Please note that during the first step of movement of the lid 17, that is, when the lid 17 is moved downward inside the container 11, the air present in the space defined between the lid 17 and the surface of the beans is expelled toward the upper end 16 or the lower end 19.

In particular, when the passage apertures 21 are open, the pressure inside the container 11 is substantially equal to atmospheric pressure. In this way, the lid 17 does not have to overcome the resistance of the air in such space when it moves, or is moved, toward the lower end 19.

In this situation, therefore, the lid 17 can progressively descend continuing to contact the beans and advantageously keeping a volume of air inside the container 11 reduced to a minimum. In this first movement step, the lid 17 has the flexible ring 31 flexed with the external edge upward.

The method also comprises a second movement step (FIG. 9), in which the lid 17 has an "upward" operation; for example, when it is to be extracted from the container 11. In this step, the lid 17 is subjected to a force which acts on the axis V in the direction of the upper end 16, for example when the lid 17 is extracted from the container 11 by means of the extraction handle 34.

The combined action of the extraction force directed toward the upper end 16 and the friction force between the first sealing means 30 and the internal surface 13 causes a downward flexion of the flexible ring 31.

In this way, it is the upper perimeter zone 33 of the flexible ring 31 that contacts the internal surface 13 of the container 11, so that the by-pass elements 32, being radial recesses of the upper perimeter zone 33, allow the passage of air through the spaces that they define between the lid 17 and the internal surface 31, from the outside toward the inside of the container 11.

This allows to reduce the resistance created by the friction force and to cancel the depression which would be generated inside the container 11, thus facilitating the upward sliding of the lid 17. Please note that this latter operation is particularly useful in the event that the hopper 10 is in the closing position, that is, with the second sealing means 39 in a closed position.

It is clear that modifications and/or additions of parts may be made to the hopper 10 and to the method of operation as described heretofore, without departing from the field and scope of the present invention, as defined by the claims.

It is also clear that, although the present invention has been described with reference to some specific examples, a person of skill in the art shall be able to achieve other equivalent forms of hermetically sealed hoppers for feeding beans, having the characteristics as set forth in the claims and hence all coming within the field of protection defined thereby.

In the following claims, the sole purpose of the references in brackets is to facilitate their reading and they must not be considered as restrictive factors with regard to the field of protection defined by the claims.

The invention claimed is:

1. A hermetically sealed hopper (10) for feeding beans comprising a closing lid (17), a container (11) having an internal surface (13), an open upper end (16), and a lower end (19) opposite said upper end (16), wherein said lid (17) is provided with first sealing means (30), of the flexible type, configured to cooperate in a sliding and hermetic manner with said internal surface (13) and comprising a flexible ring (31) provided with a plurality of by-pass elements (32), wherein said lid (17) is configured to move, when inserted in said container (11) through said upper end (16), both toward said lower end (19) and also toward said upper end (16), and said flexible ring (31) is configured to flex upward or downward in relation to a direction of movement of said lid (17) and pass from a sealing condition in which it hermetically closes said container (11), preventing a passage of air through said lid (17), to a passage condition in which it allows a passage of air by means of said plurality of by-pass elements (32), wherein in said sealing condition said flexible ring (31) is inclined by a first angle ($\alpha$1) toward said upper end (16) and in said passage condition said flexible ring (31) is inclined toward said lower end (19) by a second angle ($\alpha$2) opposite to said first angle ($\alpha$1) with respect to a horizontal plane (P).

2. The hopper (10) as in claim 1, wherein said first angle ($\alpha$1) and second angle ($\alpha$2) are comprised between 15° and 40°, preferably between 20° and 35°.

3. The hopper (10) as in claim 1, wherein said by-pass elements (32) are disposed on a perimeter zone of an upper face (33) of said flexible ring (31).

4. The hopper (10) as in claim 3, wherein said by-pass elements (32) are made as recesses which extend in a radial direction of said upper face (33) and are configured to allow the passage of air when said lid (17) slides toward said upper end (16).

5. The hopper (10) as in claim 1, wherein said flexible ring (31) protrudes radially from said lid (17) and protrudes with respect to a perimeter edge of said lid (17), and is configured to be in contact with said internal surface (13) when said closing lid (17) is inserted in said container (11).

6. The hopper (10) as in claim 5, wherein said lid (17) comprises a substantially C-shaped perimeter edge which defines a circular groove (29) and said flexible ring (31) is disposed inside said circular groove (29).

7. The hopper (10) as in claim 1, wherein said lid (17) has a weight such as to overcome a resistance generated by a friction force between said first sealing means (3) and said internal surface (13) and, during use, it is configured to move due to the action of a force of gravity toward said lower end (19).

8. The hopper (10) as in claim 1, comprising a closing bottom (20) provided with at least one outlet aperture (37) and associated with said lower end (19), which is provided with at least one passage aperture (21) configured to allow the passage of said beans, wherein that said bottom (20) and said container (11) are rotatable with respect to each other so as to define a closing position and an opening position, to allow and prevent, respectively, the passage of beans, and wherein said bottom (20) comprises second sealing means (39) configured, in the closing position, to cooperate with said at least one passage aperture (21) in order to close it with a hermetic seal.

9. The hopper (10) as in claim 8, wherein said second sealing means (39) comprise at least one circular sector provided with at least one deformable and/or elastic raised perimeter edge (40) along its perimeter which, in said closing position, cooperated with a perimeter edge (23) of said passage aperture (21) allowing the hermetically sealed closure of said passage aperture (21).

10. The hopper (10) as in claim 8, wherein in said opening position, said outlet aperture (37) is at least partly aligned with said passage aperture (21) to allow the passage of said beans.

11. A method of operation of a hopper (10) as in claim 1, comprising a preparation step in which said hopper (10) is disposed in a given machine (100), a filling step in which said beans are introduced into said container (11) through said upper end (16) and said lid (17) is inserted in said hopper (10) through said upper end (16), said method comprising an operating step in which said beans are fed and made to pass through said at least one passage aperture (21) and, as the level of said beans drops, said lid (17) slides toward said lower end (19) contacting said beans, overcoming a resistance created by a friction force thanks to the action of its weight, wherein saif first sealing means (30) are located in said sealing condition and cooperate in a sliding and hermetic manner with said internal surface (13), hermetically closing said container (11).

12. The method as in claim 11, wherein following said preparation step, said hopper (10) is axially rotated with respect to said closing bottom (20), which is integral with said machine (100), in order to pass from an opening position to a closing position, or vice versa, in order to allow or prevent, respectively, the passage of said beans through said at least one passage aperture (21) and said at least one outlet aperture (37) in correspondence with said lower end (19).

13. The method as in claim 11, wherein said method comprises a second movement step, in which said lid (16) is extracted from said container (11) by making it slide toward the upper end (16) in such a way that said first sealing means (30) pass into said passage condition and that said by-pass elements (32) allow the passage of air between said lid (17) and said internal surface (13), facilitating its extraction.

14. The method as in claim 13, wherein when said lid (17) slides toward said lower end (19) said flexible ring (31) is inclined toward said upper aperture (16), and when said lid (17) slides toward said upper end (16) said flexible ring (31) is inclined toward said lower aperture (19).

* * * * *